United States Patent Office 3,598,870
Patented Aug. 10, 1971

3,598,870
METHOD OF MAKING THE TRIACID HALIDES OF PHOSPHONOACETIC ACID
William A. Cilley, Springfield Township, and Oscar T. Quimby, Colerain Township, Hamilton County, Ohio, assignors to The Procter & Gamble Company, Cincinnati, Ohio
No Drawing. Filed Mar. 27, 1968, Ser. No. 716,339
Int. Cl. C07c 51/58
U.S. Cl. 260—544       8 Claims

ABSTRACT OF THE DISCLOSURE

The triacid chloride and bromide of phosphonoacetic acid are prepared by a two step synthesis comprising reacting phosphorus pentachloride or bromide and ketene together to obtain a pentahalophosphorus derivative and thereafter converting the pentahalophosphorus derivative to the triacid chloride or bromide of phosphonoacetic acid by adding thereto $SO_2$ or about a stoichiometric amount of water.

BACKGROUND

Ethane-1-hydroxy-1,1,2-triphosphonic acid, hereinafter referred to as E–1–HTP, is known to be a valuable sequestering and complexing agent as well as a builder in detergent compositions. Because E–1–HTP is one of the more effective detergent builders, methods of producing E–1–HTP economically, quickly and easily from the standpoint of process efficiency, are of importance especially to the detergent industry.

One of the valuable intermediates which is useful in producing E–1–HTP is phosphonoacetic acid. Phosphonoacetic acid has the empirical formula $C_2H_5O_5P$ and the structural formula:

$$(HO)_2-\overset{O}{\underset{\|}{P}}-CH_2-\overset{O}{\underset{\|}{C}}-OH$$

This compound, phosphonoacetic acid, is readily converted to E–1–HTP by the addition of two molecules of phosphorous acid to one molecule of phosphonoacetic acid. This reaction, which is disclosed in Quimby: "Phosphorus Compounds," Ser. No. 489,637, now Pat. No. 3,400,148 a copending and commonly assigned patent application which is incorporated herein by reference, may be represented by the following equation:

$$(HO)_2-\overset{O}{\underset{\|}{P}}-CH_2-\overset{O}{\underset{\|}{C}}-OH + 2H_3PO_3 \longrightarrow H_2O_3P-\underset{\underset{OH}{|}}{\overset{PO_3H_2}{\underset{|}{C}}}-\overset{PO_3H_2}{\underset{|}{CH_2}}$$

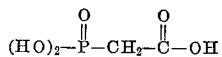
(E-1-HTP)

The ease with which this reaction takes place makes it a highly desirable route to the synthesis of E–1–HTP. Heretofore the principal drawback with this method of preparing E–1–HTP has been the unavailability of phosphonoacetic acid. The principal prior art means of synthesizing phosphonoacetic acid derivatives has been by preparing esters of phosphonoacetic acid. The difficulty with these prior art preparations, from the point of view of usefulness as intermediates for the preparation of E–1–HTP, is that esters are produced and the acid itself is required for the production of E–1–HTP through anhydride chemistry. This necessitates the hydrolysis of the ester in concentrated acid and separation of the phosphonoacetic by crystallization from a concentrated water solution. This procedure results in the formation of by-product contaminates which must be removed and furthermore is time consuming. Moreover, the phosphonoacetic acid obtained by this hydrolysis method not mater how meticulously separated still contains some undesirable by-product contaminates. Consequently, as can be seen from this background discussion, the development of a direct synthesis of phosphonoacetic acid or a derivative thereof which gives no adverse reaction by-products, would be most useful in the preparation of E–1–HTP.

SUMMARY

This development relates to a process of synthesizing the triacid chloride and bromide of phosphonoacetic acid; these compounds are readily converted to E–1–HTP. It has been found that both phosphorus pentachloride and phosphorus pentabromide will react with ketene to form, in two steps, the triacid chloride or bromide of phosphonoacetic acid. In the first step phosphorus pentachloride (or the corresponding bromide) and ketene are reacted to yield a pentahalophosphorus derivative. This may be represented by the following equation:

Step I (1) 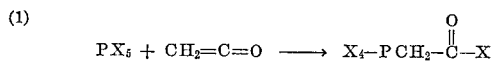

STEP II where X represents bromine or chlorine. Hereinafter in the specifications and claims the term "halo" is used to refer only to the corresponding chloride and bromide derivatives. Neither the fluoride, iodide nor astatine phosphorus derivatives are functional in this process of preparing the triacid halide of phosphonoacetic acid as disclosed herein. Additionally the symbol X is hereinafter used to refer to the chloride and bromide atoms. The second reaction step involves converting the pentahalophosphorus derivative to the triacid halide of phosphonoacetic acid. This may be accomplished by reacting the pentahalophosphorus derivative with $SO_2$ or alternatively with a stoichiometric amount of water. This second step reaction using either $SO_2$ or $H_2O$ may be represented by the following equations:

Step II (II) (a)
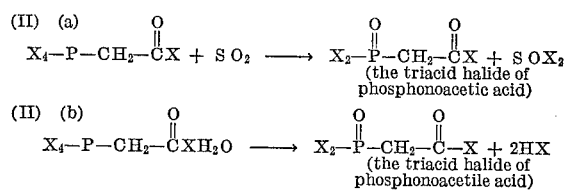

Under the preferred conditions enumerated below this two-step synthesis will proceed to give a yield of over 80 percent acid halide which can be used directly in the formation of E–1–HTP, by the addition of phosphorous acid.

More specifically the process of this invention relates to a method of synthesizing the triacid halide of phosphonoacetic acid comprising:

(a) Reacting a phosphorus pentahalide having the formula: $PX_5$, wherein X represents a chloride or bromide atom, and ketene together at temperatures of from about $-60°$ C. to about $+15°$ C. in the presence of a solvent selected from the group consisting of carbon tetrachloride, phosphorus trichloride, benzene, methylene dichloride, and toluene to form a phosphorus pentahaloderivative; and thereafter (b) Converting said phosphorus pentahalo-derivative of step (a) to the triacid halide of phosphonoacetic acid by adding thereto $SO_2$ or not substantially more than a stoichiometric amount of water.

DETAILED DESCRIPTION

The first step in this two-step synthesis reaction is represented by Equation I above. A phosphorus pentahalide and ketene are combined, under conditions fully described below, to give a pentahalophosphorus derivative.

The phosphorus pentahalide used in the Step I reaction is readily available from any one of a number of commercial suppliers. Under ordinary laboratory conditions $PCl_5$ and $PBr_5$ exist as solid slightly yellow crystalline masses. While the commercial sources of $PCl_5$ and $PBr_5$ are very satisfactory, an equally satisfactory source of these phosphorus pentahalides is an in situ reaction between $PX_3$ and $X_2$ to give $PX_5$. In brief, the selection of an adequate source of a phosphorus pentahalide poses no problem to one skilled in the art of phosphorus chemistry.

The ketene used in the Step I reaction is not as readily available as the phosphorus pentahalide. In fact, as far as is known, ketene is not available commercially. One of the principal reasons for the non-availability of ketene on a commercial scale is that the ketene, which boils at $-41°$ C. and thus is a gas at room temperature, is very difficult to store for any length of time. Although ketene can be stored for reasonable periods of time in a pure state at Dry Ice temperatures or below, it is extremely reactive and very readily polymerizes, going first to the dimer and then to higher polymers.

Because of the above referred to properties, ketene is generally made for use in on-site processes by the thermal degradation or pyrolysis of acetic acid, or acetone. The acetic acid decomposition results in the formation of ketene and water. The acetone degradation results in the formation of ketene and methane. The latter method is the one that was employed in the present invention. It may be represented by the following equation:

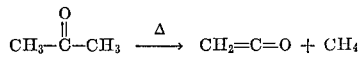

The acetone is boiled in a large round bottom flask in the neck of which is a coil of nichrome wire. This wire is electrically heated to incandescence to pyrolyze the acetone vapors. The preparation of ketene in this manner is described by G. Quadbeck—"Ketene in Preparative Organic Chemistry," in: Newer Methods of Preparative Organic Chemistry, vol. II, at pages 133–161, which is incorporated herein by this reference.

As can be seen from the above equation showing the thermal degradation of acetone, methane is obtained as a by-product. In practice the ketene thus obtained is badly contaminated with not only methane but also acetone, ethylene and carbon monoxide. Thus the ketene of necessity must be purified. Any suitable means may be employed for this purification step. One especially suitable method of ketene purification consists of a series of condensers. The ketene is passed through a water-cooled condenser, then through two condensers which are cooled by an alcohol-Dry-Ice mixture to about $-30°$ C.; next the ketene is passed through a conventional carbon tetrachloride bubbler and finally through a third Dry-Ice-alcohol condenser. The cold condensers remove most of the impurities while the carbon tetrachloride bubbler removes the last traces of acetone, it being far more soluble than ketene in carbon tetrachloride. The ketene is then chilled to a liquid in a trap held at $-60°$ C. by Dry-Ice. When ketene was needed for the reaction synthesis of this invention it was redistilled from this liquid source.

As previously mentioned either pyrolysis of acetic acid or acetone, as was used in this process, or any other alternative method of obtaining a relatively pure source of ketene is suitable. For a detailed description of the acetic acid pyrolysis method of preparing ketene see Hull, U.S. Pat. 2,232,705, Feb. 25, 1941 and Sixt and Mugden, U.S. Pat. 2,249,543, July 15, 1941 are incorporated herein by reference.

In order for the phosphorus pentahaldie to be mixed with the ketene at the low temperatures necessary for Step I of this synthesis, the phosphorus pentahalide must be in solution. This can be accomplished satisfactorily by dissolving the phosphorus pentahalide in any organic solvent (preferably an anhydrous solvent), which dissolves the phosphorus pentahalide, and which will remain a liquid at the low temperatures of the Step I reaction and which is relatively inert to the other reactant, i.e., ketene. While any suitable solvent which meets these three criteria will give equivalent results, some solvents have been found to be especially suitable for use in the Step I reaction. Those anhydrous solvents which are especially preferred are carbon tetrachloride, dichloromethane, phosphorus trichloride, benzene and toluene. The amount of solvent used to prepared the solution of the phosphorus pentahalide is not itself important and can vary widely. For any given system a satisfactory amount can readily be determined. Thus while the amount of solvent is not a critical aspect of this invention it has been determined that the process may be conveniently run if the amount of solvent is from 3 milliliters to 550 milliliters/gram of phosphorus pentahalide.

The ketene, freshly prepared in the manner described above, is bubbled into the solvent, for example toluene. While the exact molar ratio of ketene to phosphorus pentahilide for the Step I reaction is not critical, it is advantageous from the process standpoint to use equimolar quantities; however, an excess of either component may be used and quantities of the desired product are still obtained. Specifically it has been found that satisfactory results are obtained when the mole ratio of $PCl_5$ to ketene is from 1:5 to 5:1.

During the time of addition of the ketene to the phosphorus pentahalide, the reaction temperature should be kept within the temperature range of from about $-60°$ C. to about $+15°$ C., and preferably from $-30°$ C. to $+5°$ C. The lowest practical temperature at which the Step I reaction may be run is about $-60°$ C. At temperatures below $-60°$ C., the reaction is substantially retarded and more important most of the solvents suitable for dissolving phosphorus pentahalides freeze. At temperatures above $+15°$ C., the tendency of the ketene to polymerize is very marked and as mentioned previously polymerized ketene is unsuitable for use in this synthesis. Moreover, at higher temperatures and especially those temperatures above $+15°$ C., the tendency of reaction Step I to form undesirable by-products becomes much more dominant. It has been found that the highest yields are obtained when the reaction temperature is maintained within the preferred $-30°$ C. to $+5°$ C. range. The Step I reaction is an instantaneous reaction, i.e., the ketene and $PX_5$ react immediately; therefore, the $PX_5$-ketene reaction is complete as soon as the requisite amount of ketene has been added. Consequently, the only time limit that can be placed upon the Step I reaction is that amount of time needed to add the designated amount of ketene; therefore, time does not represent a critical aspect of the Step I reaction.

After the Step I reaction is completed, the Step II reaction which comprises the addition of $SO_2$ or a closely controlled amount of $H_2O$, should be completed within a reasonably short period of time, preferably in as short a period of time as is practicable. The amount of time which can safely lapse between the Step I and Step II reactions is highly dependent upon the temperature at which the ketene-phosphorus pentahalide reaction is run. For example, if the reaction is run at −60° C., the pentahalophosphorus derivative product of Step I may be kept for several hours before the addition of $SO_2$; on the other hand, if the reaction is run at 0° C. and a time of about 15 minutes lapses before the $SO_2$ or $H_2O$ is added, the by-product level may be as high as 10–20%. Thus while some product may be obtained after the Step I reaction product has been kept for longer periods of time, better yields are obtained if the preferred method of adding the $SO_2$ or $H_2O$ within about 20 minutes is employed. Moreover, from the standpoint of overall processing efficiency there is no particular advantage in letting long periods of time lapse before the addition of $SO_2$ or $H_2O$.

The Step II reaction, shown above, comprises the addition of $SO_2$ to the pentahalophosphorus derivative which is the product of the Step I reaction. As mentioned previously an equally acceptable method of performing the Step II reaction is by the addition of about a stoichiometric amount of water. Either method will give the identical end product—i.e., the triacid halide of phosphonoacetic acid. As can be seen from the Step II equation, shown above, the function of the $SO_2$ or the water is identical, that is both serve to remove two halogen atoms from the $—PX_4$ moiety and add an oxygen to the phosphorus atom. Thus the overall effect is to convert the $—PX_4$ moiety to a

moiety.

In the respect that water and $SO_2$ both perform this function in the Step II reaction, they are fully equivalent for this purpose. There are, however, a few minor differences between the use of $SO_2$ or $H_2O$ for the Step II reaction. As can be seen from the Step II equations if $SO_2$ is employed thionyl halide ($SOX_2$) is formed as a by-product whereas if $H_2O$ is employed HX is formed as a by-product. This difference is not significant, however, as both the thionyl halide and the hydrogen halide are easily removed. Both HCl and HBr boil at temperatures lower than −60° C. and are gaseous at the temperatures employed in this process and are, therefor, no problem to remove. The thionyl halide is quite volatile and can readily be removed by distillation under mild vacuum conditions at 0° C. A reduced pressure of 15 mm.–20 mm. is sufficient for this purpose and can easily be produced by a conventional laboratory aspirator. In addition, the excess solvent employed in Step I is simultaneously removed by employing this mild vacuum distillation and 0° C.

If $SO_2$ is employed in the Step II reaction, it is simply bubbled into the reaction vessel containing the product of the Step I reaction. The source of $SO_2$ gas used in this process may be any of the sources well known to one skilled in the art. For example, the gas may be produced by a number of well known chemical reactions and then allowed to enter the reaction vessel containing the product of the Step I reaction; however, because of ease of handling and overall process efficiency it is preferred to use any one of the commercially available compressed $SO_2$ gas cylinders. These allow for a quick and convenient method of bringing the $SO_2$ and Step I reaction product into contact.

The amount of $SO_2$ used is not critical. Some of the triacid halide of phosphonoacetic acid is obtained whatever level of $SO_2$ is employed; however, the best yields are obtained when at least a stoichiometric amount of $SO_2$ is used. The addition of excess quantities of $SO_2$ has no adverse effect upon the reaction; however, no particular advantage is gained by adding excess quantities.

As noted above, the preferred source of $SO_2$ is any one of the commercially available compressed gas cylinders. When using the compressed gas cylinders, the amount of $SO_2$ gas added to the reaction vessel may be controlled and/or calculated by many well known analytical techniques. One of the simplest is by controlling the flow rate of the $SO_2$ gas. Another means of determining the amount of $SO_2$ gas added to the reaction vessel is by the method of weight loss of the gas cylinder. The cylinder is weighed before the addition of $SO_2$ and then reweighed at intermittent times until the weight loss corresponds with the amount of $SO_2$ needed for the reaction.

When the alternative and equally satisfactory method of using water in Step II is employed, the amount used must be carefully controlled. For optimum results, about a stoichiometric amount of water should be employed preferably from 0.9 to 1.1 times the stoichiometric amount. If amounts of water greatly in excess of the stoichiometric amount are employed, the water will readily hydrolyze the triacid halide of phosphonoacetic acid, resulting in a corresponding decrease in product. If amounts of water less than about stoichiometric are used, the yield of the desired triacid halide of phosphonoacetic acid will be correspondingly decreased.

The water may be added as a liquid or by adding ice. A convenient method of addition is by weighing out the required amount of ice and adding it to the reaction product of Step I and then allowing it to melt and react.

After the addition of $SO_2$ or water, the reaction temperature no longer need be within the range of −60° C. to +15° C., however, as mentioned previously, if the product mixture of Step II is to be separated from the solvent it may be conveniently removed by vacuum distillation at about 0° C.

While the above description has been given with particular reference to a batch process description, it readily apparent that the process may also be conducted by a continuous process whereby excess ketene, $SO_2$ and solvent may be continuously cycled into the reaction mixture and later captured and recycled.

The following specific examples are offered to further illustrate but not limit the invention.

EXAMPLE I

Ten grams of $PCl_5$ were dissolved in 650 milliliters of $CCl_4$ at 0° C. Redistilled ketene, prepared in the manner described above, was bubbled through the solution until the reaction vessel had gained 2.0 grams in weight. The temperature was held between 0° C. and 4° C. by application of ice to the outside of the reaction flask. After all the ketene had been admitted the solution was stirred for one hour. One hundred and fifty grams of ice were added and allowed to melt and react. The mixture was allowed to stand overnight at room temperature and then a mild vacuum was applied to remove the solvent by distillation. $^{31}P$ Nuclear Magnetic Resonance (NMR) spectra of the product showed a triacidchloride of phosphonoacetic acid yield of 78% of the theoretical yield.

The triacid chloride of phosphonoacetic acid obtained as shown in this Example was then converted to E–1–HTP by reaction with an equimolar quantity of orthophosphorus acid in the presence of di-n-propyl sulfone which was used as an inert solvent. The E–1–HTP obtained in this manner can be used as an efficient builder in many detergent compositions.

EXAMPLE II

Ten grams of $PCl_5$ were dissolved in 200 milliliters of $CH_2Cl_2$ at 0° C. Redistilled ketene, prepared in the manner described above, was bubbled through the solution until a weight gain of 2 grams had been obtained. The temperature was held between 0° C. and 4° C. Immediately upon complete addition of the ketene an excess (in terms of stoichiometry) amount of $SO_2$ gas was added to the reaction mixture. The reaction mixture was allowed to stand overnight at room temperature and then a mild vacuum was applied to remove the solvent by distillation. $^{31}$P NMR spectra of the product revealed the yield of the triacid chloride of phosphonoacetic acid to be 44% of the theoretical yield.

EXAMPLE III

Five grams of PCl$_5$ were dissolved in 325 milliliters of CCl$_4$ at 0° C. Redistilled ketene, prepared in the manner described above, was bubbled through the solution until the reaction vessel had a weight gain of 2.0 grams. During the addition of ketene the temperature was held between 0° C. and 2° C. One hundred grams of ice was immediately added to the reaction mixture and allowed to melt with stirring. The mixture was allowed to stand overnight at room temperature and then a mild vacuum was applied to remove the solvent by distillation. $^{31}$P NMR spectrum analysis revealed the yield of the triacid chloride of phosphonoacetic acid to be 86% of the thoretical yield.

EXAMPLE IV

Five grams of PCl$_5$ were dissolved in 325 milliliters of CCl$_4$ at 0° C. Ketene, redistilled in the manner described above, was bubbled through the solution until the reaction vessel had a weight gain of 0.7 gram. During the addition of ketene the temperature was held between 0° C. and 2° C. One hundred grams of ice was added to the reaction mixture after the ketene addition was completed. The mixture was allowed to stand overnight at room temperature and then a mild vacuum was applied to remove the solvent by distillation. A $^{31}$P NMR spectrum analysis revealed the yield of the triacid chloride of phosphonoacetic acid to be 89% of the thoretical yield.

EXAMPLE V

Five grams of PCl$_5$ were dissolved in 325 milliliters of CCl$_4$ at 0° C. Redistilled ketene, prepared in the manner described above was added until the reaction vessel had a weight gain of 1.5 grams. As soon as all of the ketene had been added, 100 grams of ice was added to the reaction mixture and the solution was mixed well by shaking. The sample was allowed to stand overnight at room temperature and then a mild vacuum was applied to remove the solvent by distillation. A $^{31}$P NMR spectrum analysis revealed the yield of the triacid chloride of phosphonoacetic acid to be 86% of the theoretical yield.

EXAMPLE VI

Forty grams of PCl$_5$ were dissolved in 200 milliliters of toluene by warming gently. The solution was then cooled to −60° C. and redistilled ketene, prepared in the manner described above, was added until the mixture had a weight gain of 8 grams. As soon as all the ketene was added, SO$_2$ was bubbled into the solution until the reaction mixture contained an excess amount of SO$_2$. The reaction mixture was allowed to stand overnight at room temperature and then a mild vacuum was applied to remove the solvent by distillation. $^{31}$P NMR spectrum analysis of the product revealed the yield of the triacid chloride of phosphonoacetic acid to be 55% of the theoretical yield.

EXAMPLE VII

Five grams of PCl$_5$ were dissolved in 100 milliliters of C$_6$H$_6$ and then cooled in an ice bath to 0° C. Redistilled ketene, prepared in the manner described above was added until the reaction mixture gained 1.0 gram in weight. As soon as all of the ketene had been added, 100 grams of ice was added to the reaction mixture and the solution was mixed well by shaking. The sample was allowed to stand overnight at room temperature and then a mild vacuum was applied to remove the solvent by distillation. $^{31}$P NMR spectrum analysis revealed the yield of the triacid chloride of phosphonoacetic acid to be about 89% of the theoretical yield.

EXAMPLE VIII

Forty grams of PCl$_5$ were dissolved in 200 milliliters of hot toluene and then cooled to −60° C. Redistilled ketene, prepared in the manner described above was added until the reaction mixture gained 8.0 grams in weight. As soon as all of the ketene was bubbled into the solution, SO$_2$ was added by bubbling an excess amount of SO$_2$ through the solution. During the addition of SO$_2$ the temperature was maintained at 0° C. The reaction mixture was allowed to stand overnight at room temperature and then a mild vacuum was applied to remove the solvent by distillation. $^{31}$P NMR spectrum analysis revealed the yield of the triacid chloride of phosphonoacetic acid to be about 55% of the theoretical yield.

EXAMPLE IX 40 grams of PCl$_5$ were dissolved in 200 milliliters of hot toluene and then cooled to −30° C. Redistilled ketene, prepared in the manner described above, was added until the sample gained 8 grams in weight. While holding the temperature at 0° C. an excess amount of SO$_2$ was bubbled through the solution. The reaction mixture was allowed to stand overnight at room temperature and then a mild vacuum was applied to remove the solvent by distillation. $^{31}$P NMR spectrum analysis revealed the yield of the triacid chloride of phosphonoacetic acid to be about 34.1% of the theoretical yield.

EXAMPLE X

Five hundred grams of PCl$_3$ was heated to its boiling point. While the PCl$_3$ was still hot 50 grams of PCl$_5$ was placed into the PCl$_3$ solvent. The sample was then cooled to −60° C. in a Dry Ice bath. Redistilled ketene, prepared in the manner described above, was added until the sample had gained 10 grams in weight. As soon as all of the ketene was in the reaction vessel, a 65 milliliter sample was removed and excess SO$_2$ was passed through the 65 milliliter sample. During the addition of SO$_2$ the temperature was held at 0° C. The product was stored overnight at 0° F. and then a mild vacuum was applied to remove the solvent by distillation. Subsequent quantitative analysis revealed a substantial portion of the product was the triacid chloride of phosphonoacetic acid.

It should be noted that while this example and the other examples have been described with particular reference to the use of phosphorus pentachlorides in the synthesis substantially similar results are obtained when phosphorus pentabromide is substituted for the pentachlorides shown in this and the previous, and subsequent examples.

EXAMPLE XI

Ten grams of PCl$_5$ was dissolved in 150 milliliters of hot PCl$_3$. The solution was then cooled to the temperature of a Dry Ice bath. Redistilled ketene, prepared as described above, was added until the sample had gained 2.0 grams. The sample was stored overnight at 0° F. An excess amount of SO$_2$ was bubbled through the mixture held at a temperature of 0° C. A mild vacuum was applied to remove the solvent by distillation. $^{31}$P NMR spectrum analysis revealed the yield of the triacid chloride of phosphonoacetic acid to be about 40% of the theoretical yield.

What is claimed is:
1. A method of synthesizing trihalophosphonoacetic acids, which comprises:
 (a) reacting a phosphorus pentahalide having the formula: PX$_5$, wherein X represents a chlorine or bromine atom, and ketene together at temperatures of from −60° C. to about +15° C. in the presence of a solvent selected from the group consisting of carbon tetrachloride, phosphorus trichloride, benzene, methylene dichloride, and toluene; and thereafter
 (b) adding SO$_2$ to the reaction mixture formed in step (a).

2. The method of claim 1 wherein the temperature during step (a) is from −30 to +5° C.

3. The method of claim 1 wherein step (b) is performed within 20 minutes of step (a).

4. The method of claim 1 wherein the solvent is phosphorus trichloride.

5. The method of claim 1 wherein the pentahalide is phosphorus pentachloride.

6. The method of claim 5 wherein the temperature during step (a) is from −30 to +5° C.

7. The method of claim 6 wherein step (b) is performed within 20 minutes of step (a).

8. The method of claim 7 wherein the solvent is phosphorus trichloride.

References Cited

UNITED STATES PATENTS

| 2,884,454 | 4/1959 | Enk | 260—544 |
| 2,820,057 | 1/1958 | Schnizer | 260—544 |
| 2,471,472 | 4/1949 | Woodstock | 260—543 |

OTHER REFERENCES

Kosolapoff, Orgnaophosphorus Chan., p. 62.

CHARLES B. PARKER, Primary Examiner

E. J. GLEIMAN, Assistant Examiner

U.S. Cl. X.R.

252—184; 260—502.4, 543